(12) United States Patent
Hotta

(10) Patent No.: US 6,836,481 B1
(45) Date of Patent: Dec. 28, 2004

(54) PACKET CONVERSION DEVICE AND PACKET CONVERSION METHOD

(75) Inventor: Yuichi Hotta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 09/722,305

(22) Filed: Nov. 28, 2000

(30) Foreign Application Priority Data

Feb. 17, 2000 (JP) .................................... 2000-039076

(51) Int. Cl.[7] ........................ H04L 12/28; H04L 12/56
(52) U.S. Cl. ................................ 370/392; 370/401
(58) Field of Search ........................ 370/389, 390, 370/392, 401, 402, 466

(56) References Cited

U.S. PATENT DOCUMENTS

| | | | | |
|---|---|---|---|---|
| 5,361,256 A | * | 11/1994 | Doeringer et al. | 370/390 |
| 5,917,819 A | * | 6/1999 | Yang et al. | 370/390 |
| 6,181,697 B1 | * | 1/2001 | Nurenberg et al. | 370/390 |
| 6,259,701 B1 | * | 7/2001 | Shur et al. | 370/401 |

FOREIGN PATENT DOCUMENTS

| | | | | |
|---|---|---|---|---|
| JP | A 06 22492 | 8/1994 | | H04L/12/28 |
| JP | A 10-242962 | 9/1998 | | H04L/12/18 |

* cited by examiner

*Primary Examiner*—Kenneth Vanderpuye
*Assistant Examiner*—Andrew Wahba
(74) *Attorney, Agent, or Firm*—Staas & Halsey LLP

(57) ABSTRACT

A packet conversion device provided at the entrance/exit of a network that rewrites the header of a multi-cast data transfer packet and inputting the packet to the network as a uni-cast data transfer packet, and/or rewriting the header of the uni-cast data transfer packet received from the network and outputting the packet as a multi-cast data transfer packet.

5 Claims, 20 Drawing Sheets

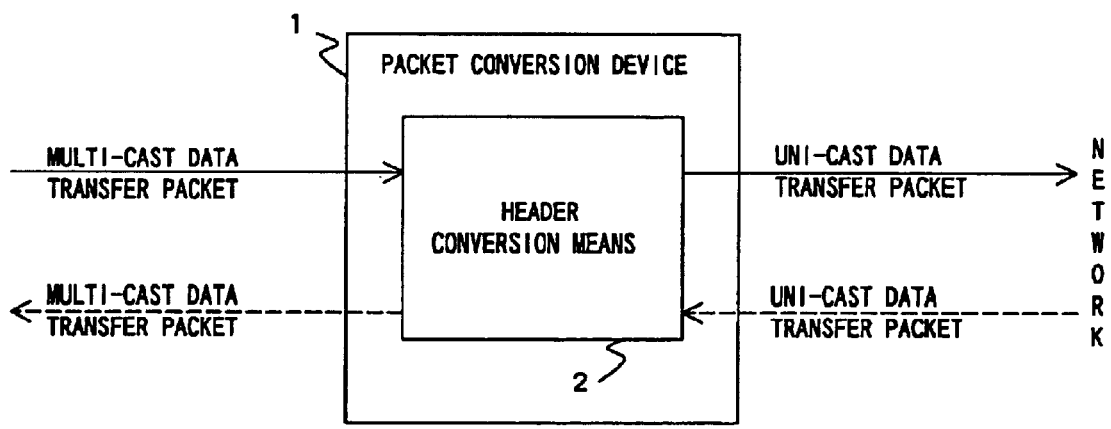
F I G. 3

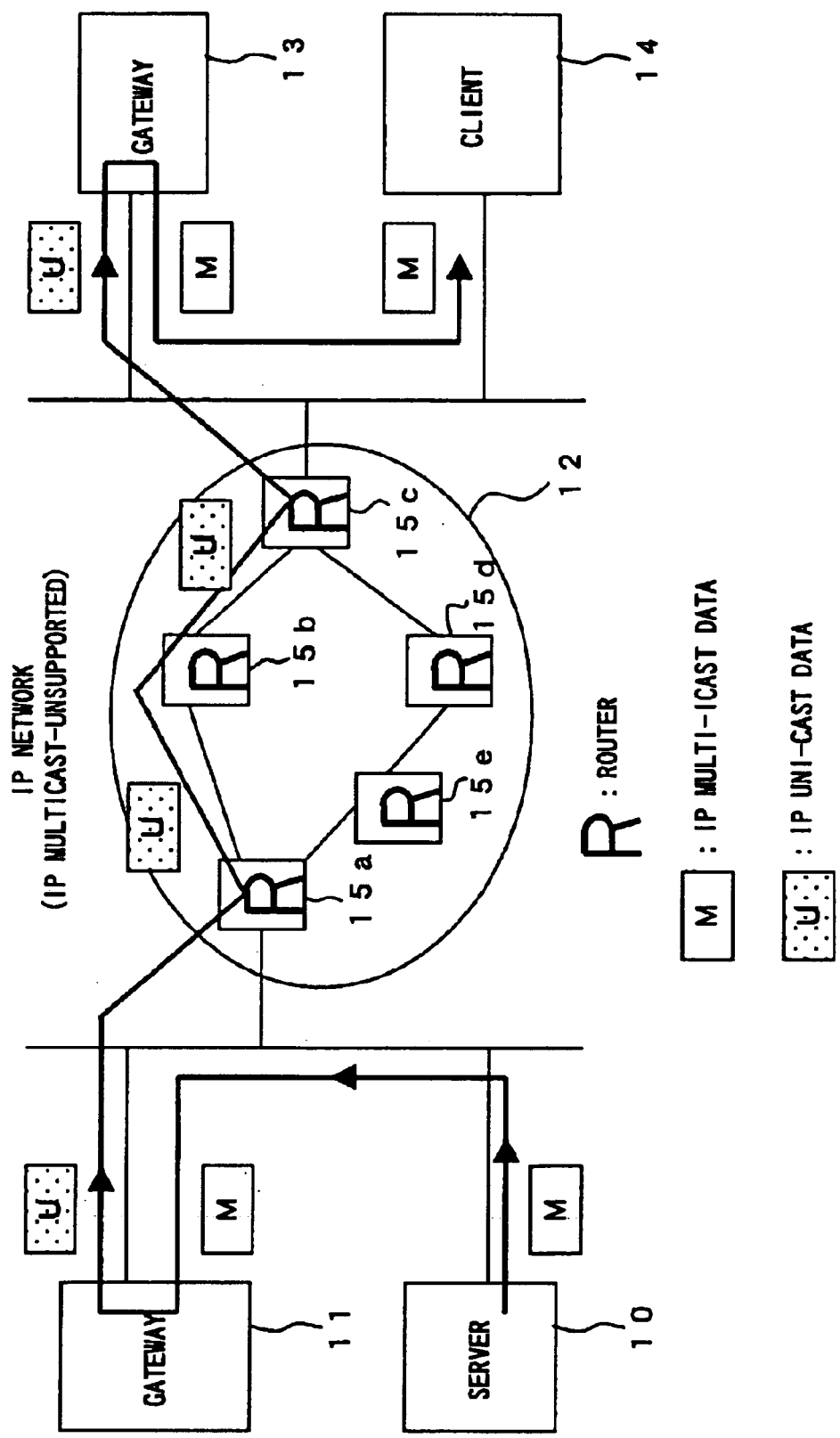
F I G. 5

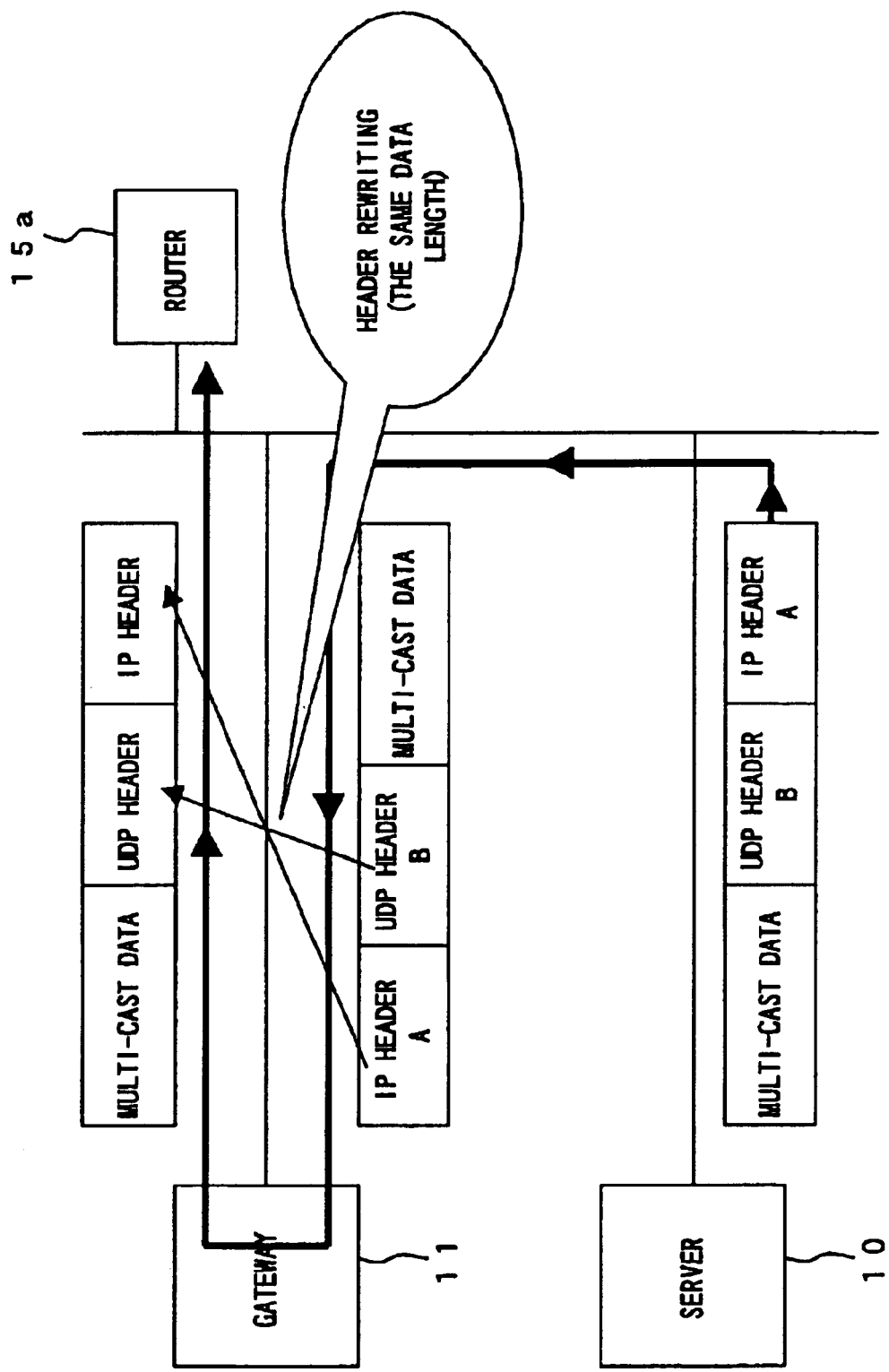
F I G. 6

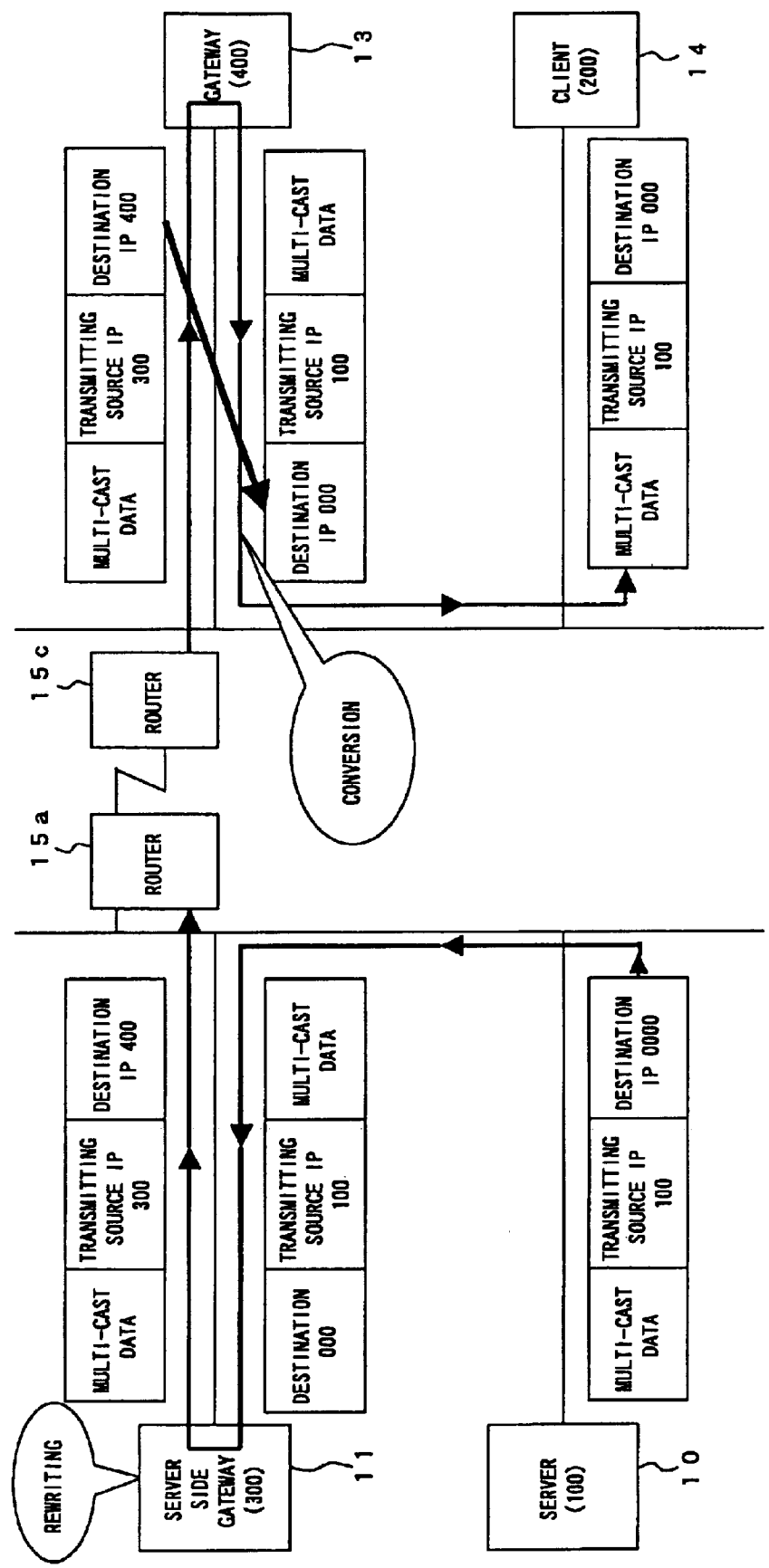
F I G. 7

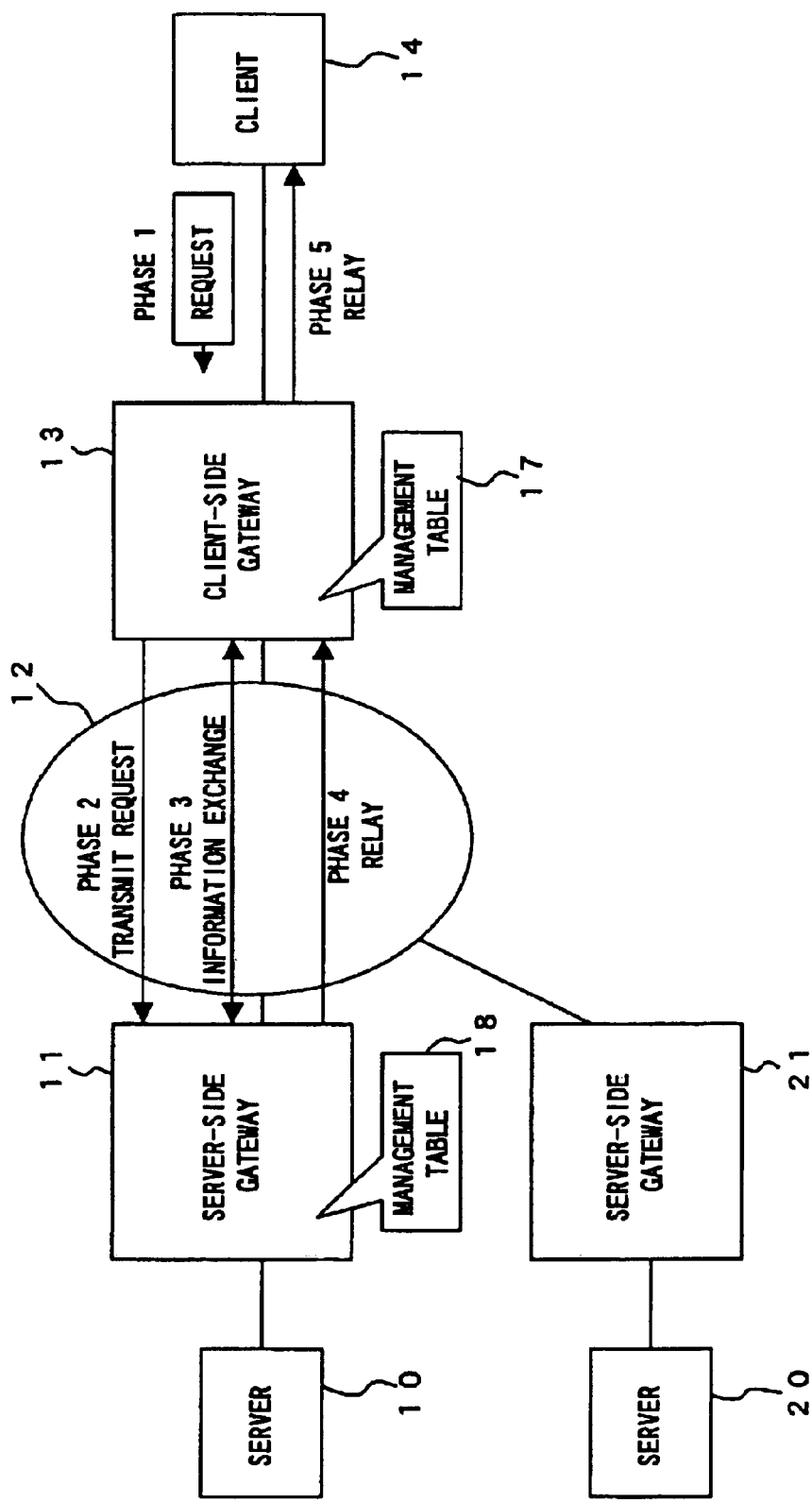
F I G. 8

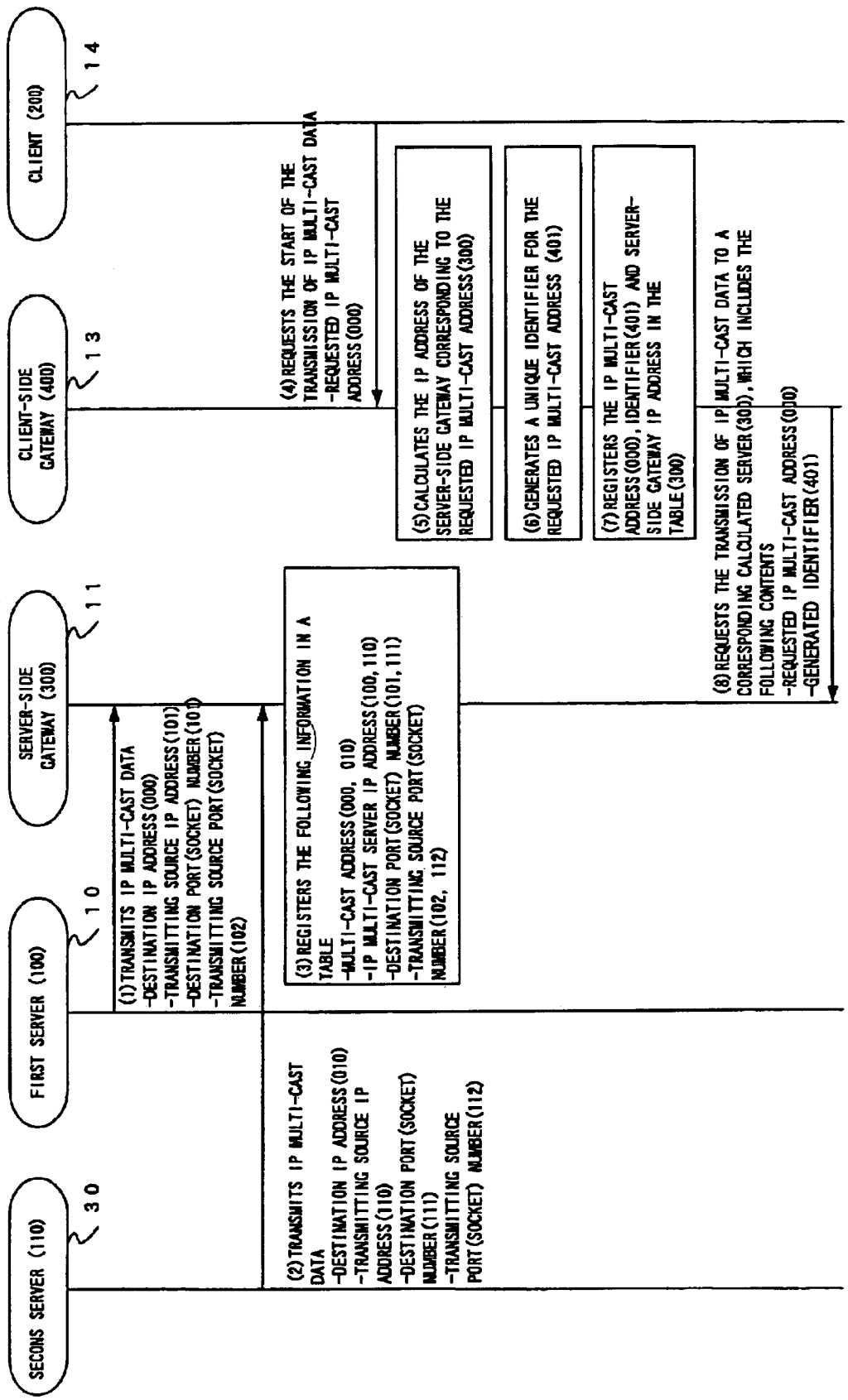
F I G. 11

| | DESTINATION IP ADDRESS | TRANSMITTING SOURCE IP ADDRESS | DESTINATION PORT (SOCKET) NUMBER | TRANSMITTING SOURCE PORT (SOCKET) NUMBER | DATA SECTION | REMARKS |
|---|---|---|---|---|---|---|
| (1) | 000 | 100 | 101 | 101 | MULTI-CAST REAL DATA | |
| (2) | 010 | 110 | 111 | 112 | | |
| (4) | 000 | 200 | — | — | MULTI-CAST REQUEST COMMAND | |
| (8) | 300 | 400 | FIXED(301) | 401 | REQUESTED IP MULTI-CAST ADDRESS =000 | A DESTINATION PORT NUMBER IS A VALUE MEANING A RELAY REQUEST |
| (10) | 400 | 300 | 401 | FIXED(301) | IP ADDRESS OF AN IP MULTI-CAST SERVER=100 DESTINATION PORT (SOCKET) NUMBER =101 TRANSMITTING SOURCE PORT (SOCKET) NUMBER=102 | |
| (12) | 300 | 400 | FIXED(301) | 401 | RECEPTION-READY NOTICE | |
| (14) | 400 | 300 | 401 | FIXED(301) | | |
| (16) | 000 | 100 | 101 | 102 | | |

F I G. 1 5

| | DESTINATION IP ADDRESS | TRANSMITTING SOURCE IP ADDRESS | DESTINATION PORT (SOCKET) NUMBER | TRANSMITTING SOURCE PORT (SOCKET) NUMBER | DATA SECTION | REMARKS |
|---|---|---|---|---|---|---|
| (1) | 000 | 100 | 101 | 101 | MULTI-CAST REAL DATA | |
| (2) | 010 | 110 | 111 | 112 | | |
| (4) | 000 | 200 | — | — | MULTI-CAST REQUEST COMMAND | |
| (8) | 300 | 400 | FIXED(301) | 401 | REQUESTED IP MULTI-CAST ADDRESS =000 | A DESTINATION PORT NUMBER IS A VALUE MEANING A RELAY REQUEST |
| (10) | 400 | 300 | 401 | FIXED(301) | DESTINATION PORT (SOCKET) NUMBER =101 TRANSMITTING SOURCE PORT (SOCKET) NUMBER=102 | |
| (12) | 300 | 400 | FIXED(301) | 401 | RECEPTION-READY NOTICE | |
| (14) | 400 | 300 | 401 | FIXED(301) | | |
| (16) | 000 | 400 | 101 | 102 | | |

F I G. 1 6

| | DESTINATION IP ADDRESS | TRANSMITTING SOURCE IP ADDRESS | DESTINATION PORT (SOCKET) NUMBER | TRANSMITTING SOURCE PORT (SOCKET) NUMBER | DATA SECTION | REMARKS |
|---|---|---|---|---|---|---|
| (1) | 000 | 100 | 101 | 102 | MULTI-CAST REAL DATA | |
| (2) | 010 | 110 | 111 | 112 | | |
| (4) | 000 | 200 | — | — | MULTI-CAST REQUEST COMMAND | |
| (8) | 300 | 400 | FIXED(301) | 401 | REQUESTED IP MULTI-CAST ADDRESS =000 | A DESTINATION PORT NUMBER IS A VALUE MEANING A RELAY REQUEST |
| (10) | 400 | 300 | 401 | FIXED(301) | IP ADDRESS OF AN IP MULTI-CAST SERVER=100 DESTINATION PORT (SOCKET) NUMBER =101 TRANSMITTING SOURCE PORT (SOCKET) NUMBER=102 | |
| (12) | 300 | 400 | FIXED(301) | 401 | RECEPTION-READY NOTICE | |
| (14) | 400 | 300 | 401 | FIXED(301) | | |
| (16) | 000 | 000 | 101 | 102 | | |

F I G. 17

F I G. 1 8 A

| ITEM | MULTI-CAST ADDRESS | SERVER IP ADDRESS | DESTINATION PORT (SOCKET) NUMBER | TRANSMITTING SOURCE PORT (SOCKET) NUMBER | CLIENT-SIDE GATEWAY IP ADDRESS | IDENTIFIER |
|---|---|---|---|---|---|---|
| VALUE | 000 | 100 | 101 | 102 | 400 | 401 |
|  | 010 | 110 | 111 | 112 |  |  |
| GENERATION TIMING | (3) | (3) | (3) | (3) | (9) | (9) |

F I G. 1 8 B

| ITEM | MULTI-CAST ADDRESS | SERVER-SIDE GATEWAY IP ADDRESS | IDENTIFIER | SERVER IP ADDRESS | DESTINATION PORT (SOCKET) NUMBER | TRANSMITTING SOURCE PORT (SOCKET) NUMBER |
|---|---|---|---|---|---|---|
| VALUE | 000 | 300 | 401 | 100 | 101 | 102 |
| GENERATION TIMING | (7) | (7) | (7) | (11) | (11) | (11) |

F I G. 1 9 A

| ITEM | MULTI-CAST ADDRESS | SERVER IP ADDRESS | DESTINATION PORT (SOCKET) NUMBER | TRANSMITTING SOURCE PORT (SOCKET) NUMBER | CLIENT-SIDE GATEWAY IP ADDRESS | IDENTIFIER |
|---|---|---|---|---|---|---|
| VALUE | 000 | 100 | 101 | 102 | 400 | 401 |
| | 010 | 110 | 111 | 112 | | |
| GENERATION TIMING | (3) | (3) | (3) | (3) | (9) | (9) |

F I G. 1 9 B

| ITEM | MULTI-CAST ADDRESS | SERVER-SIDE GATEWAY IP ADDRESS | IDENTIFIER | DESTINATION PORT (SOCKET) NUMBER | TRANSMITTING SOURCE PORT (SOCKET) NUMBER |
|---|---|---|---|---|---|
| VALUE | 000 | 300 | 401 | 101 | 102 |
| GENERATION TIMING | (7) | (7) | (7) | (11) | (11) |

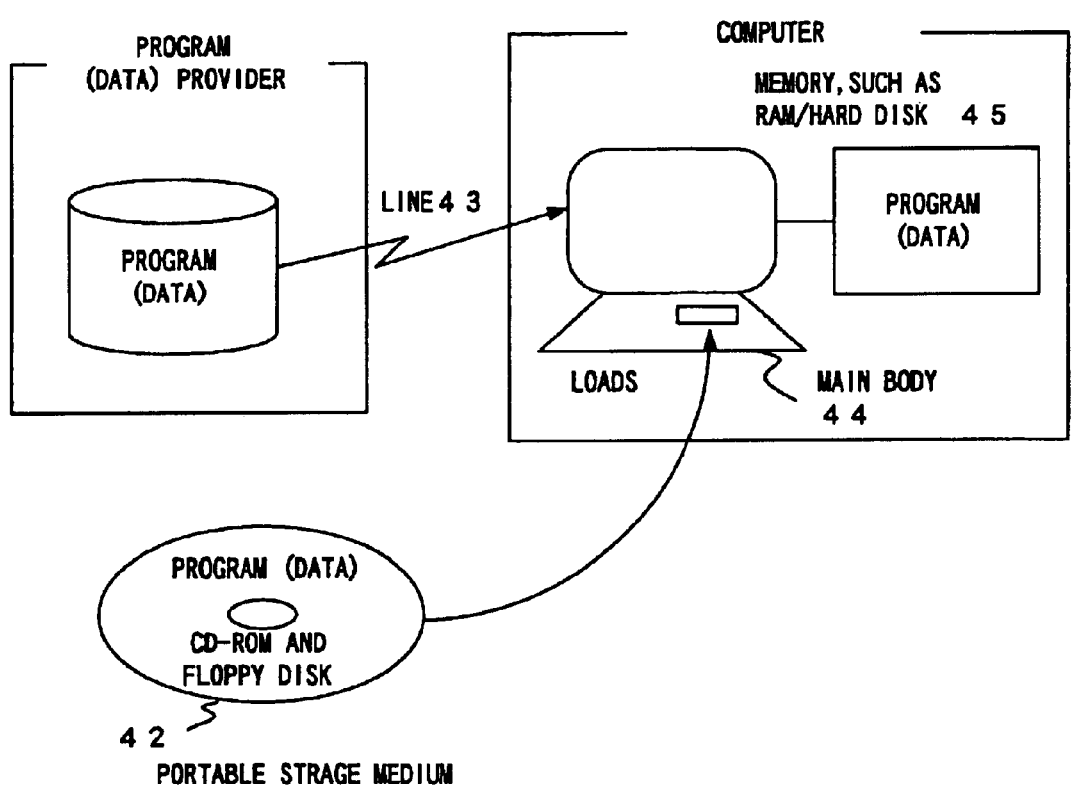
F I G. 2 0

PACKET CONVERSION DEVICE AND PACKET CONVERSION METHOD

BACKGROUND OF THE INVENTION

1. Field of the Invention

The present invention relates to a communications system using a network and in particular relates to a packet conversion device and a packet conversion method for communicating by converting a multi-cast data transfer packet to a uni-cast data packet that can be used in one-to-one communications in a network when the network does not support a multi-address calling for transmitting a message from a transmitter to a plurality of receivers at one time, that is, multi-cast communications.

2. Description of the Related Art

For example, recently a demand for a live relay and a conference type multi-cast communications service on the Internet has been increasing. The first prior art of such a multi-cast communication system is described with reference to FIG. 1. In the first prior art, for example, when an IP (Internet protocol) packet is inputted to the Internet, a method of attaching an IP header to the top of the packet is adopted to transfer the IP packet to multiple clients as a multi-cast data packet on the Internet.

For example, in the case of a live relay, multi-cast data packets are always transmitted from a server 50 for distributing the data to a network. Each of a plurality of clients requesting the live relay asks a network side for the relay of multi-cast data packets always transmitted from the server 50, and the multi-cast data packets are relayed. In such a case, multi-cast data packets transmitted from the server 50 are inputted to a router 52 for controlling packet transfer on the Internet via a gateway 51. In this case, a packet transmitted from the server 50 stores both an IP header A and a UDP (user datagram protocol) header B. However, when the packet is inputted from the gateway 51 to the router 52, an IP header X for distributing the packet to a plurality of clients is attached to the top of the packet, and the packet is inputted to the network.

FIG. 2 shows the second prior art of a multi-cast communications system. This technology is disclosed in the following reference.

Japanese Patent Laid-open No. 10-242962: Multi-cast Gateway Communication System and Method on the Internet In FIG. 2, it is assumed that a network already supports multi-cast communications and it is a terminal on a client side requesting the reception of multi-cast data that does not support multi-cast communications. In this case, for example, an IP multi-cast data packet that is transmitted from a server 55 and is transferred on an IP multicast-supported network 56 is copied as much as required by a gateway on the client side, and is generally relayed to a plurality of terminals on the side of a client 58 as an IP uni-cast data packet.

In the first prior art of an IP header adding system described with reference to FIG. 1, since an IP header must be attached to a packet transferred on a network, a part of the packet must be deleted in the gateway 57 when data equivalent to the maximum packet length of the Ethernet are attempted to be transmitted, and the data corresponding to the maximum packet length of the Ethernet cannot be transmitted, which is a problem. If there is a failure on the network, the analysis of the failure is difficult since the packet format is different from an ordinary one, which is another problem.

In the second prior art described with reference to FIG. 2, a part that does not support multi-cast communications is limited to a terminal in a receiving side. However, since software for supporting multi-cast communications is sold on the consumer market, the terminal can easily support multi-cast communications. It is a case where a network side, such as a router, etc., does not support multi-cast communications that matters. Although it can be said that the Internet basically supports multi-cast communications, the number of IP addresses for multi-cast communications are limited. For example, a virtual public network (VPN), where LANs between the headquarters of an enterprise and each of the plants are connected using the Internet, cannot support a large scale of multi-cast data communications, which is a problem.

SUMMARY OF THE INVENTION

It is an object of the present invention to provide both a packet conversion device and a packet conversion method for converting a packet header at the entrance/exit of a network to transfer a multi-cast data packet as a uni-cast data packet on the Internet in light of the problems described above.

The packet conversion device of the present invention is provided at the entrance/exit of a network and comprises a header conversion means for rewriting the header of a multi-cast data transfer packet and inputting the packet to the network as a uni-cast data transfer packet and/or rewriting the header of the uni-cast data transfer packet received from the network and outputting the packet as a multi-cast data packet.

According to the present invention, the header of a packet transmitted as multi-cast data from a terminal is converted to the header of uni-cast data corresponding to the multi-cast and is transmitted. Therefore, even if the network does not support multi-cast communications, the transfer of multi-cast data can be implemented by the same process as that of the transfer of uni-cast data.

Although a header is converted, new information is not added. Therefore, there is no change in packet length. Accordingly, the packet can be handled in the same way as another packet.

BRIEF DESCRIPTIONS OF THE DRAWINGS

FIG. 3 shows the basic configuration of the present invention.

FIG. 5 shows the data flow of the multi-cast data communications system shown in FIG. 4.

FIG. 6 shows the rewriting of a header by a gateway.

FIG. 7 shows how to convert an IP header when multi-cast data are transferred.

FIG. 8 shows the basic operation in a network system.

FIG. 11 is a sequence chart showing the former half of an operation performed by two gateways in the first, second and third methods.

FIG. 15 shows an example of data used in the first method.

FIG. 16 shows an example of data used in the second method.

FIG. 17 shows an example of data used in the third method.

FIGS. 18A and 18B show examples of the respective management tables of two gateways in the first method.

FIGS. 19A and 19B show examples of the respective management tables of two gateways in the second method.

FIG. 20 shows the loading into a computer of a program in the present invention.

DESCRIPTION OF THE PREFERRED EMBODIMENTS

Figure 1:
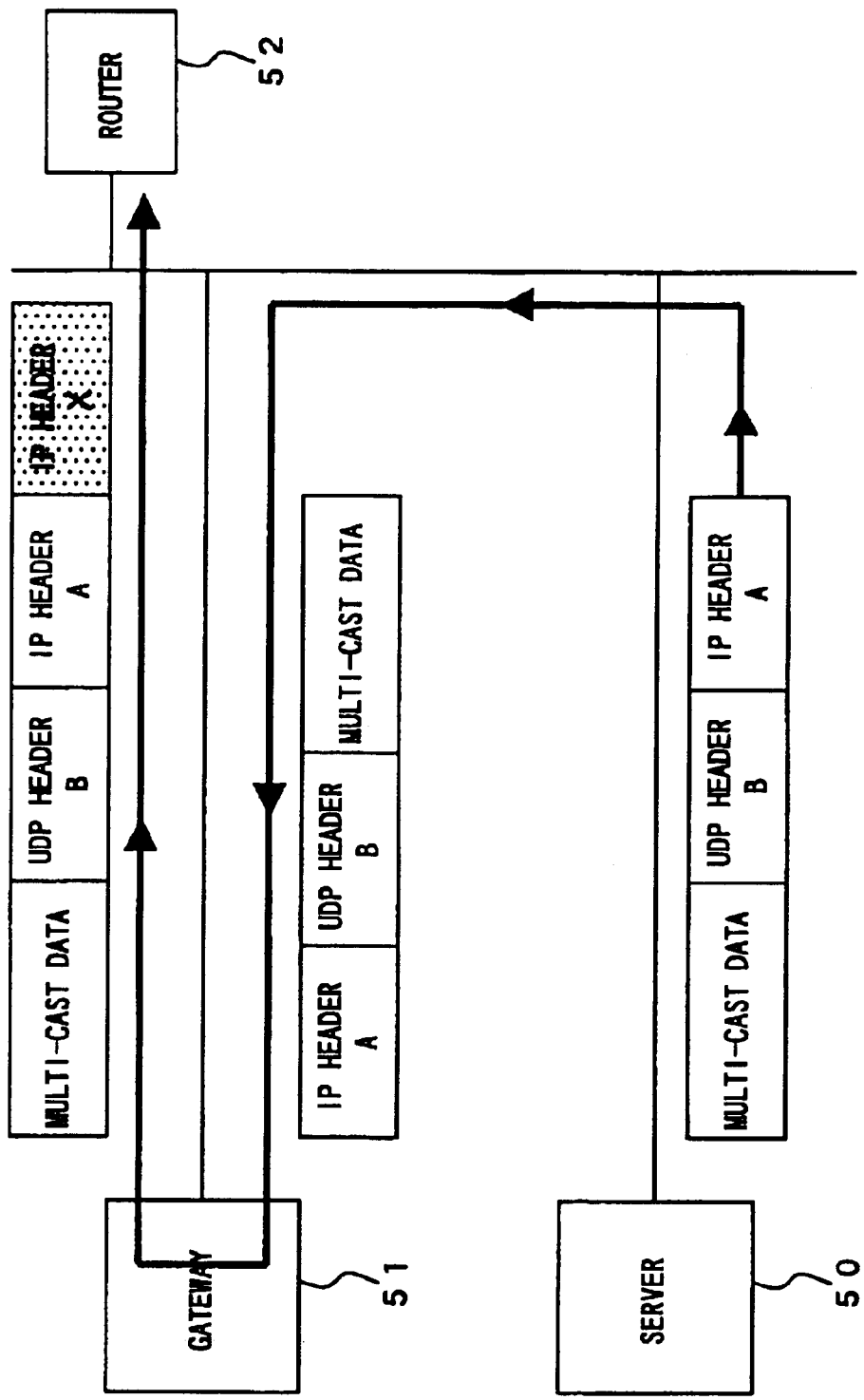
FIG. 1 shows the first example of the prior art of multi-cast data communications.
Figure 2:
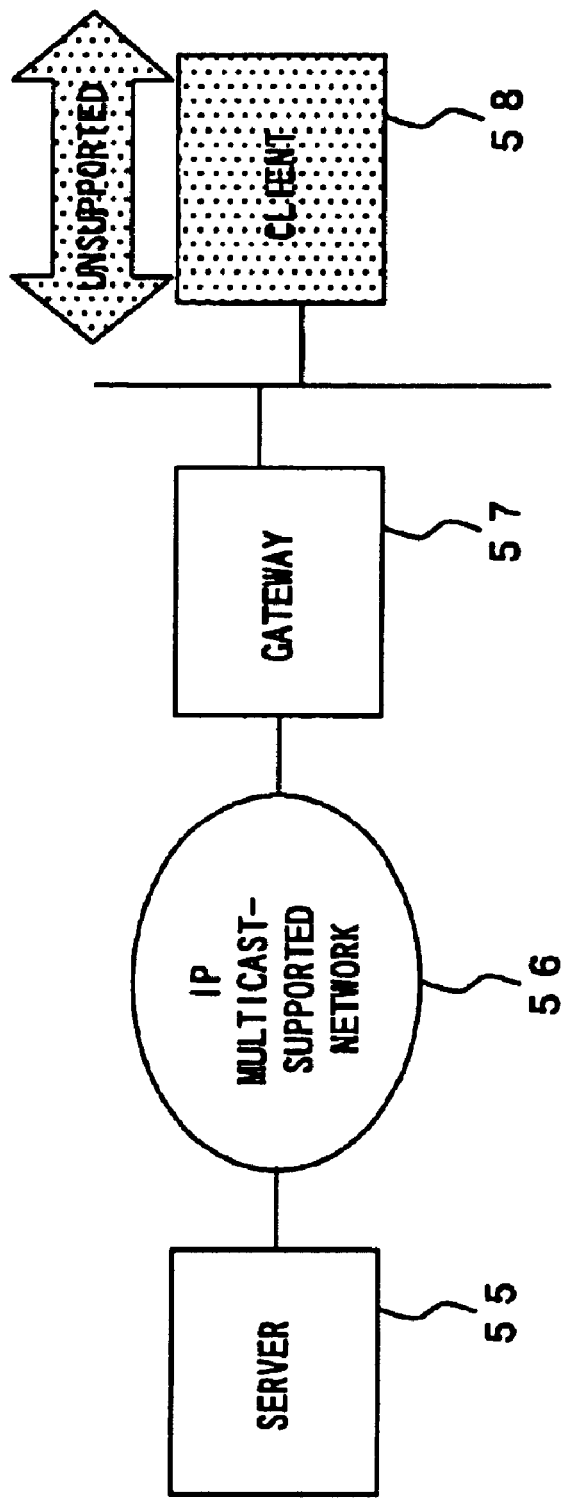
FIG. 2 shows the second example of the prior art of multi-cast data communications.

FIG. 3 shows the basic configuration of the present invention. FIG. 3 shows the basic configuration of a packet conversion device for converting packets that is provided at the entrance/exit of a network.

In FIG. 3, a header conversion means 2 provided in a packet conversion device 1 rewrites the header of a multi-cast data transfer packet, such as an IP multi-cast data packet, and inputs the packet to the network as a uni-cast data transfer packet, such as an IP uni-cast data packet, and/or rewrites the header of the uni-cast data transfer packet received from the network and outputs the packet, for example, to a client as a multi-cast data transfer packet.

In the preferred embodiments of the present invention, the network described earlier is a wide area network, such as the Internet, and a packet conversion device can be provided in a gateway apparatus connecting the wide area network with a local area network. The header conversion means 2 can rewrite both a packet destination IP address and a transmission source IP address in the packet.

In the preferred embodiment of the present invention, a header conversion device can also be provided in both a gateway apparatus on a server side and a gateway apparatus on a client side. This server-side gateway apparatus belongs to a local area network and is connected to a server for distributing multi-cast data transfer packets, while the client-side gateway apparatus belongs to a different local area network and is connected to a client, which is the request source of a, multi-cast data transfer packet.

In this case, the packet conversion device provided in the client-side gateway apparatus can also comprise means for generating an identifier corresponding to a multi-cast data receive request on receipt of the request from a client.

The packet conversion device provided on the client-side gateway apparatus can also further comprise means for storing this identifier in relation to the IP address of the multi-cast data, while the packet conversion device provided on the server-side gateway apparatus can also further comprise means for storing the identifier reported from the client side in relation to the IP address of the multi-cast data.

Furthermore, in the preferred embodiment of the present invention, the packet conversion device can also comprise a router for performing the transfer control of packets in the network.

The packet conversion method of the present invention is a method for converting packets at the entrance/exit of the network. According to the method, the header of a multi-cast data transfer packet is rewritten, the multi-cast data transfer packet is inputted to the network as a uni-cast data transfer packet, the header of the uni-cast data transfer packet received from the network is rewritten and the uni-cast data transfer packet is outputted as a multi-cast data transfer packet.

In this case, the network is a wide area network, and a gateway apparatus connecting the wide area network with a local area network can also conduct the packet conversion.

The packet conversion device provided at the entrance/exit of a network uses the storage medium of the present invention. The storage medium is a computer-readable portable storage medium on which is recorded a program for enabling a computer to rewrite the header of a multi-cast data transfer packet and to input the packet to the network as a uni-cast data transfer packet, or to rewrite the header of the uni-cast data transfer packet received from the network and to output the packet as a multi-cast data transfer packet.

In this way, according to the present invention, multi-cast data can be transferred even in a network that does not support multi-cast communications, by converting the header of a multi-cast data transfer packet and transferring the packet as a uni-cast data transfer packet in the network.

For example, in a virtual public network where two local area networks are connected via the Internet, multi-cast data distributed from a server belonging to one of the local area networks can be transferred without fail to a client that belongs to the other local area network via the Internet and that requests the multi-cast data.

Figure 4:
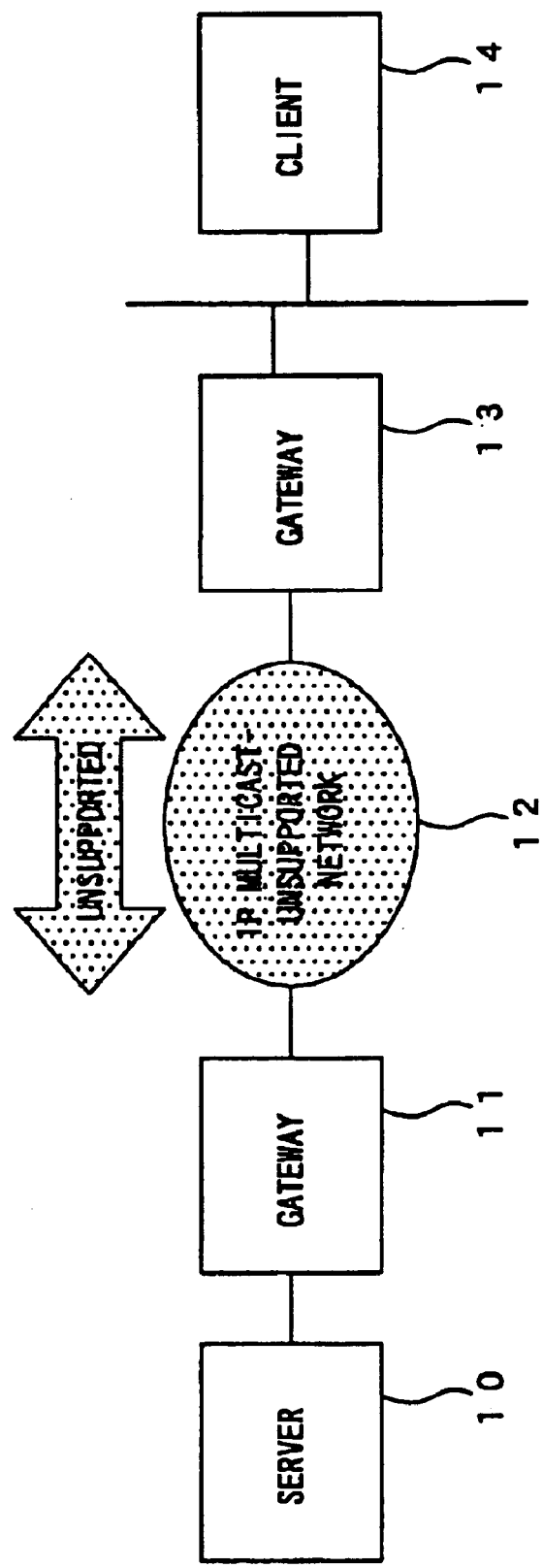
FIG. 4 shows the entire configuration of a multi-cast data communications system adopting the header conversion system of the present invention.

FIG. 4 shows the entire configuration of a multi-cast data communications system adopting the header conversion system of the present invention. In FIG. 4, it is assumed that generally multi-cast data are transmitted from a server 10 to a client 14 at the request of the client 14. A network 12 located between the server 10 and client 14 is, for example, the Internet and is a network that does not support multi-cast communications or is at least a black box for the server 10 or client 14. Therefore, it is unknown whether the network supports IP multi-cast communications, and it is proper to consider that the network does not support multi-cast communications.

In FIG. 4, multi-cast data transmitted from the server 10 are supplied to an IP multicast-unsupported network 12 via a server-side gateway 11, for example, in a form of a packet, and are transferred to the client 14 via a client side gateway 13 to which the client 14 is connected by routing in the network.

FIG. 5 shows the data flow of the system shown in FIG. 4. In FIG. 5, IP multi-cast data M transmitted from the server 10 are inputted to the server-side gateway 11, the IP data are converted here and are inputted to the IP network 12 that does not support IP multi-cast communications, as IP uni-cast data U.

In the IP network 12, a plurality of routers 15a–15e are provided, and the inputted IP uni-cast data U are transferred to a router 15c connected to the gateway 13 on the client side 14 that receives the data, for example, via routers 15a and 15b.

The header of the IP uni-cast data U outputted from the router 15c to the gateway 13 is converted by the client-side gateway 13 and the packet is supplied to the client 14 as IP multi-cast data M.

FIG. 6 shows the rewriting of a header by a gateway. A header conversion by the gateway 11 on the server 10 side is described with reference to FIG. 6.

It is assumed that the server 10 belongs to one local area network (LAN), such as the Ethernet, and the packet of the Ethernet is transmitted to the gateway 11. It is also assumed that the maximum packet length in the Ethernet is 1,518 bytes, including CRC data attached last, and that a header is attached in front of real data, which is multi-cast data. It is also assumed that an MAC (media access control), an internet protocol (IP) header A and a user datagram protocol (UDP) header B are stored in the header section, in that order, from the top. Neither CRC nor MAC is shown in FIG. 6.

This multi-cast data packet M is inputted to the gateway 11, and both the IP header and UDP header are rewritten. For example, the IP header and UDP header are rewritten from A to C and from B to D, respectively. The rewritten packet is inputted to the router 15a in the IP network as an IP uni-cast data packet.

In the packet conversion by the gateway 11, generally only both the IP header and UDP header are converted, and neither of the data length of the real data, the packet length of the entire packet or the format is changed at all. Therefore, data of the maximum data length corresponding to the maximum length of a packet in the Ethernet can be transmitted to the client side as an IP multi-cast data packet without modifications. For example, if there is a failure on the IP network, both the header of the packet and the format of the storage area, such as data, etc., are left without modifications and the content of the failure can be easily analyzed.

FIG. 7 shows the header conversion, in particular the IP header conversion conducted when multi-cast data are transferred from a server to a client. In FIG. 7 it is assumed that an IP address is 100, 200, 300 and 400 for the server 10, client 14, server-side gateway 11 and client-side gateway 13, respectively, and the IP address for IP multi-cast data is 000.

In the IP header of the multi-cast data packet transmitted from the server 10, 000 indicating the address of the multi-cast data and 100 indicating the address of the server 10 are stored as a destination IP address and a transmission source IP address, respectively, and are supplied to the gateway 11. The UDP header, etc., described with reference to FIG. 6 is omitted here to simplify the description.

The IP header is rewritten in the gateway 11. Specifically, in order to convert a multi-cast data packet to a uni-cast data packet, the header is converted to a form in which both the transmitting source and destination of the uni-cast data packet are the same as those of the multi-cast data packet. For example, 400 indicating the address of the gateway 13 and 300 indicating the address of the gateway 11 are stored as a destination IP address and a transmission source IP address, respectively, and are supplied to the router 15a in the IP network in such a way that a data packet can be transferred from the gateway 11 to the gateway 13.

As described with reference to FIG. 5, in the IP network 12, a data packet storing the multi-cast data is inputted from the router 15c connected to the client-side gateway 13 to the gateway 13 as a uni-cast data packet.

The header of this packet is converted again by the gateway 13 and the packet is transmitted to the client 14 as a multi-cast data packet. Specifically, the destination IP address and transmitting source IP address are converted to 000 indicating the address of the multi-cast data and 100 indicating the IP address of the server 10 distributing this multi-cast data, respectively, and are supplied to the client 14.

FIG. 8 shows the basic operation in the network system ranging from the client's multi-cast data request up to the actual supply of the data to the client. The basic operation in the system between phase 1 to phase 5 is described with reference to FIG. 8 assuming phase where the client 14 requests for multi-cast data and a phase where the multi-cast data packet is actually relayed and supplied to the client 14 as phases 1 and 5, respectively.

First, in phase 1, a data-request packet for requesting the relay of multi-cast data is transmitted from the client 14 to the client-side gateway 13. Then, the client-side gateway 13 refers to a management table 17 stored in the gateway and judges whether an identifier, etc., corresponding to the requested multi-cast data is registered, as described later. If the identifier, etc., is not registered, the gateway 13 registers necessary data, and in phase 2, it transmits a packet requesting the transmission of multi-cast data to the server-side gateway 11. This packet stores a multi-cast data transmit request, including an identifier corresponding to the multi-cast data stored in the management table 17, as real data.

In phase 3, the server-side gateway 11 transmits/receives necessary information to/from the client-side gateway 13. In this information exchange, information required to restore this packet to the IP multi-cast data packet actually transmitted from the server 10 being the distribution source of the multi-cast data is transmitted/received when the client-side gateway 13 actually receives a uni-cast data packet, including the multi-cast data. In this information exchange, both the gateways 11 and 13 register necessary data in management tables 18 and 17, respectively. After the information exchange is terminated, the client-side gateway 13 notifies the server-side gateway 11 of the completion of the receiving preparation in order to request the transmission of an IP uni-cast data packet storing the multi-cast data as real data.

As described earlier, an IP multi-cast data packet is always transmitted from the server 10 to the server-side gateway 11. Therefore, in phase 4, the server-side gateway 11 rewrites both the IP header and UDP header, as described earlier, and executes a tunneling process of relaying a packet, including the multi-cast data, to the client-side gateway 13 as an IP uni-cast data packet.

The client-side gateway 13 refers to the content of the management table 17, rewrites both the IP header and UDP header of the IP uni-cast data packet received from the server-side gateway 11, performs tunneling for relaying the packet to the client 14 as the IP multi-cast data packet and terminates the process.

Then, both the processes executed by a client-side gateway and a server-side gateway and the operating sequences in a network system are described.

Figure 9:
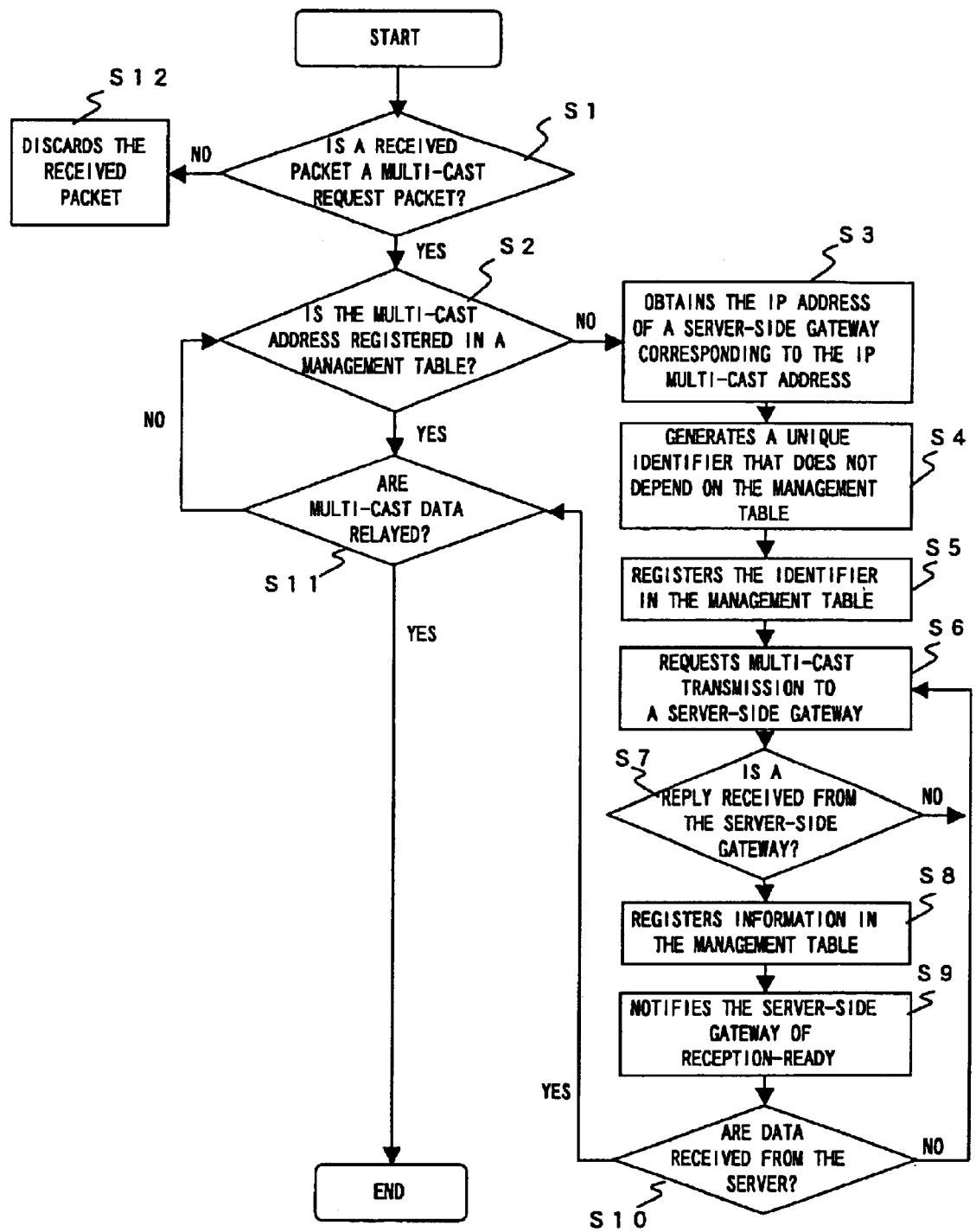
FIG. 9 is a flowchart showing a process executed by a gateway on a client side.

FIG. 9 is a flowchart showing a process executed by a client-side gateway. In FIG. 9, when the process is started, first it is judged whether a packet received in step S1 is a multi-cast data request packet transmitted from the client in phase 1 shown in FIG. 8. If the packet is the request packet, in step S2 it is judged whether the address of the multi-cast data requested in step S2 is already registered in the management table 17. If the address is not registered yet, the flow proceeds to the processes in and after step 3.

In step S3, the IP address of the server-side gateway corresponding to the address of the requested IP multi-cast data (300 in the example shown in FIG. 7) is obtained. In step S4, a unique identifier that is not registered in the management table 17 is generated in relation to the address of the multi-cast data. In step S5, the multi-cast data address, server-side gateway address and identifier are registered in the management table 17.

Then, in step S6, as a process in phase 2, a multi-cast data transmit request is transmitted from the client-side gateway 13 to the server-side gateway 11. In step S7 it is judged whether a reply is received from the server-side gateway. If the reply is not received yet, the processes in and after step S6 are repeated. The real data of the transmit request packet transmitted to the server-side gateway 11 in step S6 includes both 000 indicating the address of the requested multi-cast data and the value of an identifier corresponding to the address.

If it is judged that a reply from the server is received, in step S8 the content of the information exchange is registered in the management table 17 as a process in phase 3. Information added here includes the IP address of a server transmitting the requested multi-cast data (the server 10 in the example shown in FIG. 7), a transmission source port (socket) number being the port number of the server 10, which is a part of the UDP header described above, and a destination port (socket) number that does not need to be basically specified since it is the destination of multi-cast data.

When the additional registration of information in the management table 17 is completed, in step S9, a multi-cast data reception-ready notice is issued to the server-side gateway 11 as the final step of phase 3. Then, in step S10 it is judged whether data are relayed from the server-side gateway 11 in phase 4, specifically it is judged whether the multi-cast data are received. If the multi-cast data are not received yet, it can be considered that there is an error in the process between the management table 17 and server-side gateway 11. Therefore, the flow returns to the processes in and after step S6, for example, the additional information registration in the management table, etc., is made again.

In step S10, the multi-cast data are relayed from the server-side gateway 11. If it is judged that the data are received, in step S11 it is judged whether the relay of the multi-cast data is continued. If the relay is continued, the process is terminated. If it is judged that the address of multi-cast data corresponding to the multi-cast data request transmitted from the client as a process in phase 1 in step S2 is already registered in the management table 17, in step S11 it is judged whether the multi-cast data are relayed since the processes in steps S3–S10 are considered to have been already executed. If the data are relayed, the process is terminated. If the data are not relayed yet, the processes in and after S2 are repeated to relay the multi-cast data. Furthermore, if the packet received from the client 14 in step S1 is not a multi-cast data request packet, a packet received in step S12 is discarded since the system does not support the process to be executed in the present invention.

Figure 10:
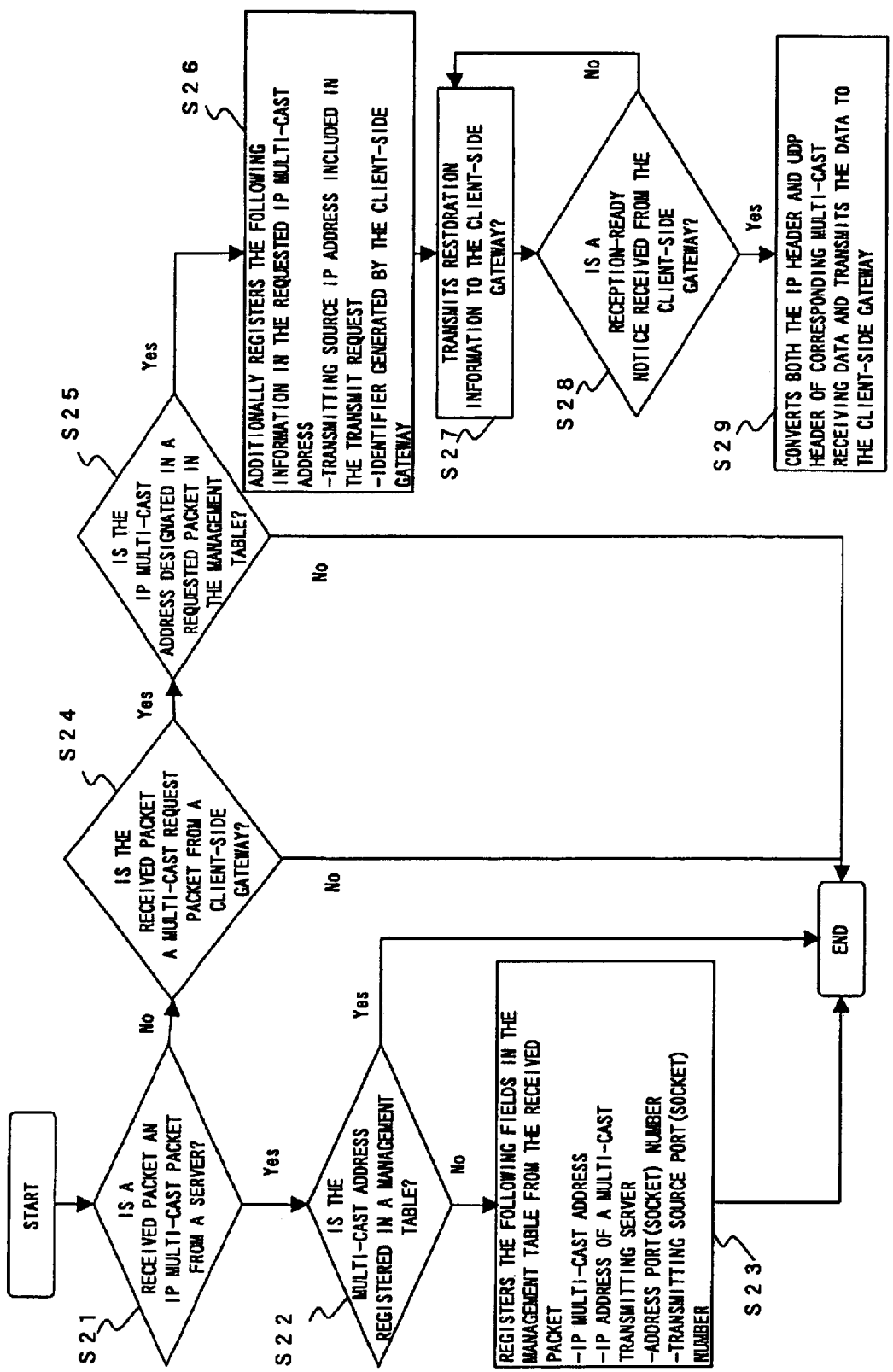
FIG. 10 is a flowchart showing a process executed by a gateway on a server side.

FIG. 10 is a flowchart showing a process executed by the server-side gateway. In FIG. 10, when the process is started, first, it is judged whether a packet received in step S21 is the IP multi-cast data packet always transmitted from the server side, as described earlier. If the packet is the multi-cast data packet, in step S22 it is judged whether the address of the multi-cast data is already registered in the management table 18 shown in FIG. 8. If the address is already registered, the process is terminated without any further process. If the address is not registered, the address of the IP multi-cast data, the IP address of the IP multi-cast data transmitting server (100 in the example shown in FIG. 7), a destination port (socket) number and a transmission source port (socket) number are registered from the received packet, and the process is terminated.

If it is judged that the packet received in step S21 is not an IP multi-cast data packet, it is judged whether a packet received in step S24 is a multi-cast data request packet transmitted from the client-side gateway. If it is judged that the packet is not the request packet, the process is terminated without any further process since it has no relation to the process of the present invention.

If the packet is a multi-cast data request packet, it is judged whether the address of an IP multi-cast data requested in step S25 is already registered in the management table 18. If the address is not registered yet, a multi-cast data packet cannot be relayed since an IP multi-cast data packet that should always be transmitted from a server side is not received, and the process is terminated.

If the IP multi-cast data address is already registered in step S25, in step S26 both a transmission source IP address included in the data request packet, that is, the IP address of the client-side gateway 13 (400 in the example shown in FIG. 7) and the value of an identifier generated by the client-side gateway are additionally registered in relation to the address of the IP multi-cast data requested by the client-side gateway. In step S29, restoration information required to restore a multi-cast data packet from the uni-cast data packet in the client-side gateway, such as the destination port (socket) number, transmission source port (socket) number, etc., described earlier, is transmitted to the client-side gateway. In step S28 it is judged whether a reception-ready notice transmitted from the client-side gateway 13 is received. If the notice is not received yet, the processes in and after S27 are repeated.

If in step S28 it is judged that the reception-ready notice is received from the client-side gateway 13, the information exchange in phase 3 is terminated. In step S29, both the IP header and UDP header of the relevant multi-cast data packet are converted, and the packet is relayed to the client-side gateway as a uni-cast data packet as a process of phase 4.

Next, the sequences of the operations performed by both the client-side gateway and server-side gateway are described with reference to flowcharts shown in FIGS. 9 and 10, sequence charts shown in FIGS. 11–14, data used in this operation shown in FIGS. 15–17 and examples of both the format and storage data of the management tables provided in the server-side gateway and client-side gateway shown in FIGS. 18A and 18B and 19A–C.

Although multi-cast data requested by a client, that is, a user, are finally relayed from the client-side gateway 13 to the client 14, the client basically checks only whether the destination IP address of the received packet matches the address of the multi-cast data requested by the user. Therefore, even if the transmitting source IP address of the data is set in any way when the operation is shifted from phase 4 to phase 5 and the client-side gateway restores the IP uni-cast data packet relayed by the server-side gateway to an IP multi-cast data packet, it is considered that there is basically no problem.

Therefore, the preferred embodiments of the present invention adopt as a method of setting the transmitting source IP address of data stored in the IP header of an IP multi-cast data packet transmitted to a client by a client-side gateway one of three methods: the first method using the IP address of an IP multi-cast data transmitting server, the second method using the IP address of a client-side gateway and the third method using the IP address of multi-cast data. These methods are described as [1], [2] and [3], respectively.

FIG. 11 is a sequence chart showing the former half of the operating sequences executed by both the server-side gateway and client-side gateway. The chart is common to the three methods described above. In FIG. 11, the operations in phases 1 and 2 described above are performed.

In FIG. 11, although it is assumed that generally the second server 30 distributing different multi-cast data are also connected to the server-side gateway 11 in addition to the first server 10 corresponding to the server 10 shown in FIG. 8, in this example a multi-cast data packet finally relayed to the client 14 is distributed by the first server 10.

In (1) shown in FIG. 11, the first server 10 starts transmitting multi-cast data. In this example it is assumed that an IP multi-cast data packet stores 100 indicating the address of the multi-cast data as a destination IP address and 100 as the IP address of a transmitting source server in the IP header, and stores 101 as a destination port (socket) number and 102 as a transmitting source port (socket) number in the UDP header.

In (2), the second server 30 starts transmitting different multi-cast data. As in (1), this data packet stores 010 indicating the address of the multi-cast data as a destination IP address, server address 110 as a transmitting IP address, 111 as a destination port (socket) number and 112 as a transmitting source (socket) number. These IP addresses and port numbers are shown in an IP header, a UDP header and the upper two lines (1) and (2) of the data section shown in FIG. 15. The multi-cast data packet transmitted in (1), that is, data transmitted from the first server includes multi-cast real data to be required by the client side.

In (3), the server-side gateway 11 that has received these multi-cast data packets registers the data in the management table 18. The contents registered in this case are the multi-cast address, server IP address, destination port (socket) number and transmitting source port (socket) number in the management table of the server-side gateway shown in FIGS. 18A and 18B, which are stored in the management able 18 of the server-side gateway in generation timing (3) in relation to the respective addresses.

In (4), the client 14 transmits a data request packet requesting the start of the transmission of IP multi-cast data to the client-side gateway 13. As shown in (4) of FIG. 15, in this transmission start request, the destination IP address and transmitting source IP address in the IP header are set to 000 indicating the address of the multi-cast data and 200 indicating the IP address of the client 14, and it is indicated in the data section that the transmission of multi-cast data is requested. There is no need to specify both the destination port number and transmitting source port number in the UDP header of this packet, which is, for example, left blank.

In (5), the client-side gateway 13 judges that the IP address of the server-side gateway 11 corresponding to the requested multi-cast data address is 300, and in (6), the gateway 13 generates 401 as the unique identifier of the address of the requested multi-cast data, in (7), the gateway 13 registers the contents of the multi-cast data address, server-side gateway IP address and identifier, as shown in the management table of the client-side gateway shown in FIGS. 18A and 18B.

After completing the registration of data in the table, in (8), the client-side gateway 13 transmits a packet requesting the transmission of an IP multi-cast data packet to a corresponding server-side gateway 11. As shown in (8) of FIG. 15, in this request, 300 indicating the address of the server-side gateway 11 and 400 indicating the IP address of the client-side gateway 13 are set as a destination IP address and a transmitting source IP address in the IP header, respectively, and 401 indicating the port number of the client-side gateway 13 is set as a transmitting source port (socket) number in the UDP header. It is assumed that the destination port (socket) number is for example, fixed to 301 as a port number where a multi-cast data packet relay request is inputted. It is indicated in the data section of this request packet that the address of the requested IP multi-cast data is 000.

Figure 12:
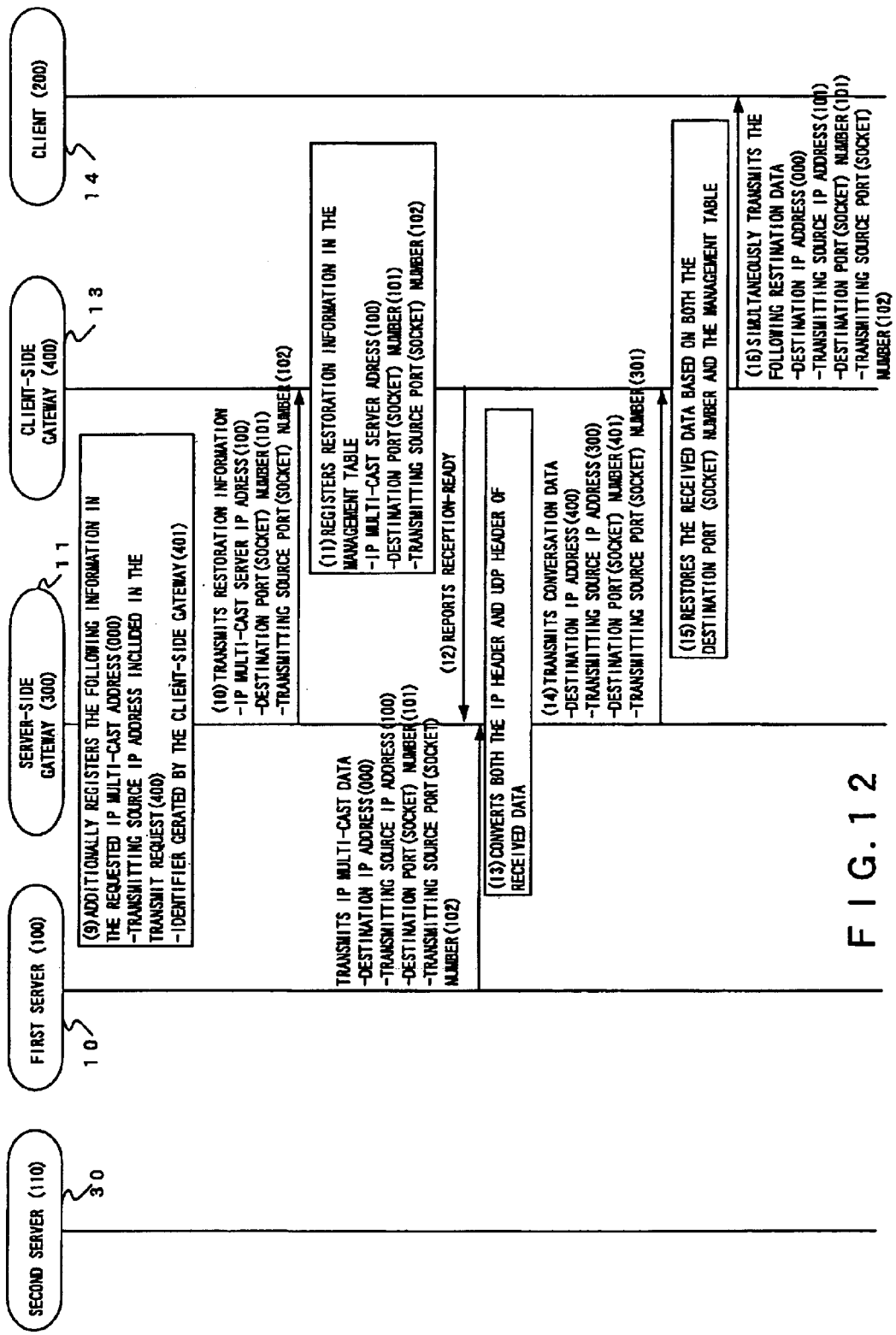
FIG. 12 is a sequence chart showing the latter half of an operation in the first method.

In FIG. 11, the operations of phases 1 and 2 are completed and the operation sequence chart shown in FIG. 12 shows the operations of the latter half in phases 3–5 in the first method [1].

In FIG. 12, first, as a process in phase 3, both the transmitting source IP address included in a data transmit request by the client side, that is, 400 and the identifier 401 generated by the client-side gateway 13, are stored in the management table 18 of the server-side gateway in relation to the address 000 of the requested IP multi-cast data, as shown in FIGS. 18A and 18B.

Then, in (10), the server-side gateway 11 transmits information required to restore the data to the client-side gateway 13. The addresses in the IP header and port numbers in the UDP header of this packet for transmitting restoration information can be obtained by exchanging the destination and transmitting source addresses in the multi-cast data relay request packet transmitted from the client-side gateway 13 in (8) with each other. In the data section, 100, 101 and 102 are stored as the IP address of an IP multi-cast server, which is information required to restore the data, a destination port (socket) number and a transmitting source port (socket) number, respectively.

In (11), the client-side gateway 13 registers the received restoration information in the management table 17. The registration content in this case include 100, 101 and 102 as a server IP address, a destination port number and a transmitting source port number, respectively.

After completing the registration of the restoration information in the management table, in (12), the client-side gateway 13 transmits a packet notifying the server-side gateway 11 of being reception-ready. Both the destination and transmitting source addresses included in the IP address and the destination and transmitting source port numbers included in the UDP address of this packet are the same as those in the data relay request packet in (8), and the data section of the packet stores the reception-ready notice. This completes the operation in phase 3.

On receipt of the reception-ready notice from the client-side gateway 13, the server-side gateway 11 starts relaying the multi-cast data. The IP multi-cast data packet continues to be always transmitted from the first server 10 to the server-side gateway 11 in the same way as described in (1). Therefore, in (13), the server-side gateway 11 converts both the IP header and UDP header of the multi-cast data packet received from the first server 10.

Then, in (14), the server-side gateway 11 relays the data packet, both the IP data header and UDP header of which are converted to the client-side gateway 13 as a uni-cast data packet in the network. The contents of the data, such as IP addresses and port (socket) numbers included in the IP header and UDP header, respectively, of the relayed data packet are the same as the contents of the packet headers obtained at the time of transmitting restoration information in (10).

On receipt of the data packet relayed from the server side, in (15), the client-side gateway 13 converts both the IP header and UDP header referring to the content of the management table 17 and restores the multi-cast data packet. Then, in (16), the restored multi-cast data packet is relayed, that is, a multi-address calling and supply of the data to the client 14 is conducted. The destination IP address, transmitting source IP address in the IP header, destination port (socket) number and transmitting source port (socket) number in the UDP address of this restored multi-cast data packet are 000 indicating the address of the multi-cast data, 100 indicating the address of the server 10, 101, which does not have much meaning, and 102 indicating the port number of the first server 10, respectively.

Figure 13:
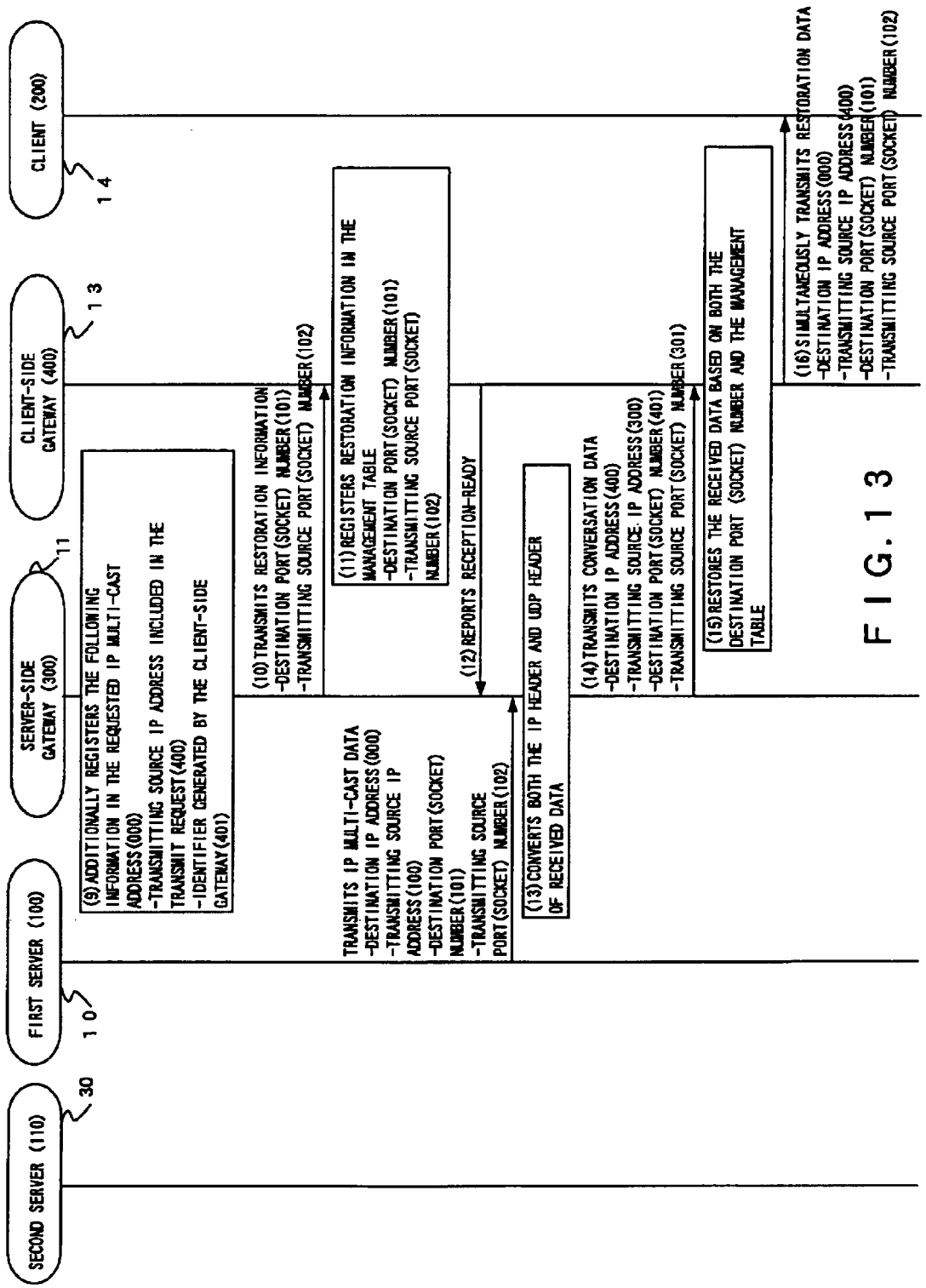
FIG. 13 is a sequence chart showing the latter half of an operation in the second method.

FIG. 13 shows the latter half of the operating sequences in the second method, that is, [2] described earlier. FIG. 16 shows data stored in the IP header, UDP header and data section of a packet in [2]. FIGS. 19A and 19B show examples of both the format and stored data of a management table in [2].

The former half of the operating sequences in [2] is the same as that as shown in FIG. 11.

Therefore, the data corresponding to (1)–(8) shown in FIG. 16 are the same as those shown in FIG. 15, and the contents of the respective management tables provided in the server-side gateway and client-side gateway shown in FIGS. 19A and 19B are the same as those in generation timings (3) and (7), respectively.

Since there are many of the same parts in the operating sequences in the latter half shown in FIG. 13 as those shown in FIG. 12, only different parts from FIG. 12 are described. As described earlier, in [2], when an IP multi-cast data packet is finally relayed from the client-side gateway 13 to the client 14, the point where the IP address 400 of the client-side gateway 12 is stored as a transmitting source IP address is different from [1]. Therefore, the client-side gateway 13 does not require the IP address 100 of the first server 10 being the distribution source of the multi-cast data as restoration data used when the IP uni-cast data packet relayed by the server-side gateway 11 is converted to a multi-cast data packet.

Therefore, the restoration information transmitted from the server-side gateway 11 to the client-side gateway 13 in (10) need not include the IP address 100 of a server, unlike in (10) shown in FIG. 12. This is indicated by the fact that the data section in (10) shown in FIG. 16 does not include 100 indicating the IP address of a server unlike in (10) shown in FIG. 15.

Therefore, in (13) shown in FIG. 13, the restoration information stored in the management table 17 of the client-side gateway 13 does not include the IP address 100 of the first server 10. For this reason, there is no storage area of a server IP address in the management table of the client-side gateway shown in FIGS. 18A and 18B, unlike in FIG. 17, and in generation timing (11), it is indicated that only a destination port (socket) number and a transmitting source port (socket) number are stored.

FIG. 13 is different from FIG. 12 only in the fact the transmitting source IP address included in the IP header of an IP multi-cast data packet relayed from the client-side gateway 13 to the client 14 in (16) is not 100 as in (16) shown in FIG. 12, that is, the address is not the IP address of the first server 10, rather it is 400, that is, the address is the IP address of the client-side gateway 13. This is indicated by the fact that the transmitting IP address in (16) shown in FIG. 16 is 400 while the transmitting source IP address in (16) shown in FIG. 15 is 100.

Figure 14:
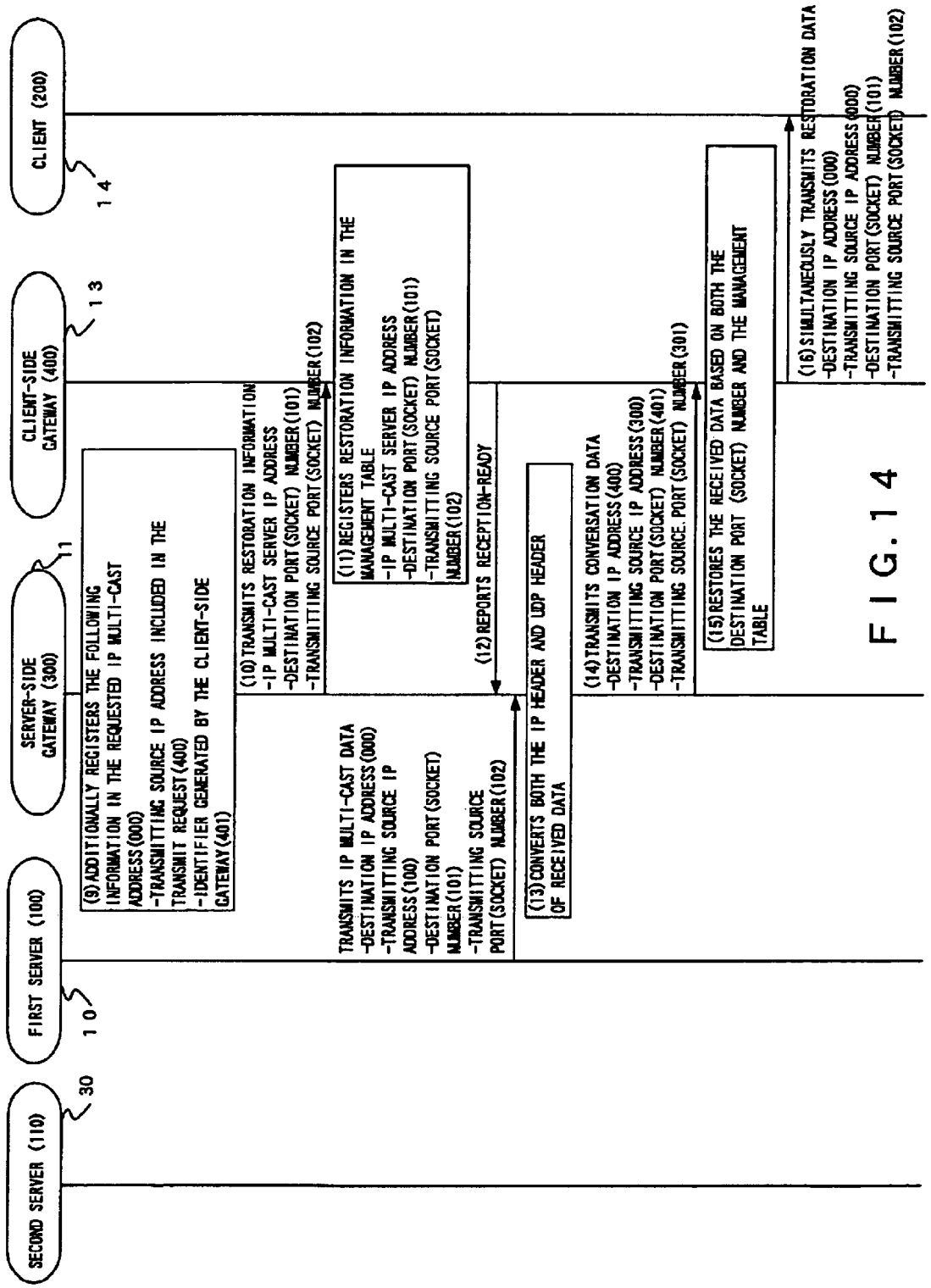
FIG. 14 is a sequence chart showing the latter half of an operation in the third method.

FIG. 14 is a sequence chart showing the latter half of the operation in [3] described earlier. FIG. 17 shows data stored in the IP header, UDP header and data section. The former half of the operating sequences in [3] is also the same as that shown in FIG. 11. Therefore, data corresponding to (1)–(8) shown in FIG. 17 are also the same as those shown in FIGS. 15 and 16. Since the format and stored data of the respective management tables provided in the server-side gateway and client-side gateway in [3] are the same as those shown in FIGS. 18A and 18B, the descriptions are omitted here.

The operation up to (15) shown in FIG. 14 is the same as that in [1] shown in FIG. 12. Therefore, the data up to (14) shown in FIG. 17 are the same as those shown in FIG. 15.

Only an operation performed when a multi-cast data packet is finally relayed from the client-side gateway 13 to the client 14 is different from that in [1]. In [3], in this case the address 000 of multi-cast data requested by the client 14 is used as a transmitting source IP address in the IP header. This is the only difference from the fact that in FIG. 12 the IP address 100 of the first server 10 is used as a transmitting source IP address. In relation to this difference, the transmitting source IP address in (16) shown in FIG. 17 is also 000.

Lastly, the loading of a program into a computer in the present invention is described with reference to FIG. 20. Although the conversion of headers in the present invention is conducted, for example, by both a gateway device connecting a local area network to which a server belongs, with the Internet and a gateway device connecting the Internet with a LAN to which a client belongs, these gateway devices can also be constituted using a computer as a basic element.

The respective program used in FIGS. 9 and 10 of the present invention is stored in the memory 45 of a computer 41, and a main unit 44 executing the program can conduct the header conversion.

This program is stored, for example, in a portable storage medium 42 and is executed by loading the storage medium 42 into the computer 41 or by transferring the program from a program provider to the computer via a network line 43.

For the memory 45 of the computer 41, a random-access memory (RAM), a read-only memory (ROM), a hard disk, etc., can be used. For the portable storage medium 42, an arbitrary computer-readable storage medium, such as a memory card, a floppy disk, a CD-ROM, an optical disk, a magneto-optical disk, etc., can be used. Although in the above description, mainly a case where an IP multi-cast data packet is distributed from one server to one client via the Internet is targeted, the target of the present invention is not limited to this. For example, if there are two LANs corresponding to the plant and office of one enterprise at both ends of the Internet and, for example, a TV conference is conducted between the office and plant, multi-cast data can also be transmitted/received to/from one LAN to another. In this case, the provision of the header conversion device of the present invention is not always limited to the gateway device, and the header conversion device can also be provided, for example, in the router of an IP network.

In this way, according to the present invention, multi-cast communications, for example, can be conducted between two local area networks composing a virtual public network (VPN) by converting a multi-cast data packet to a uni-cast data packet by header conversion and by inputting the packet to a network that does not support multi-cast communications or a network where it is unknown whether multi-cast communications are not supported, which greatly contributes to the spread of multi-cast data communications.

What is claimed is:

1. A network connection system connecting a wide area network to local area networks having at least one server and at least one client, comprising:

a client side gateway, connected to the at least one client in a client side local area network, receiving a reception request from the at least one client to receive multicast data transfer packets and having a client side packet conversion device including
    a client side header rewriting unit rewriting destination and origination Internet Protocol addresses contained in Internet Protocol headers of at least some packets passing therethrough, supplying to the client side local area network an inbound client side unicast data transfer packet obtained by rewriting a first header of an inbound client side multicast data transfer packet, and supplying to the wide area network an outbound client side multicast data transfer packet obtained by rewriting a second header of an outbound client side unicast data transfer packet received from the client side local area network,
    an identifier generation unit generating an identifier corresponding to the reception request, and
    a client side identifier storage unit storing in a client side management table, the identifier in association with the Internet Protocol address of the outbound multicast data transfer packet; and
a server side gateway, connected to the at least one server in a server side local area network, distributing multicast data transfer packets and having a server side packet conversion device including
    a server side header rewriting unit rewriting destination and origination Internet Protocol addresses contained in the Internet Protocol headers of at least some packets passing therethrough, supplying to the server side local area network an inbound server side unicast data transfer packet obtained by rewriting a third header of an inbound server side multicast data transfer packet, and supplying to the wide area network an outbound server side multicast data transfer packet obtained by rewriting a fourth header of an outbound server side unicast data transfer packet received from the server side local area network,
    a server side identifier storage unit storing in a server side management table, the identifier, generated by the identifier generation unit and transmitted from the client side packet conversion device, in association with the Internet Protocol address of the outbound multicast data transfer packet, and
    an information exchange unit accepting the reception request from the at least one client transmitted from said client side packet conversion device, exchanging with said client side gateway data required for retrieving from the at least one server a multicast data transfer packet specified by the reception request; and starting data transmission upon completing information exchange with said client side gateway.

2. The network connection system according to claim 1, wherein the wide area network is the Internet.

3. The network connection system according to claim 1, further comprising a router for performing a transfer control of packets in the network.

4. A method for connecting a wide area network to local area networks, comprising:
    receiving at a client side gateway a reception request from at least one client to receive multicast data transfer packets;
    rewriting destination and origination Internet Protocol addresses contained in Internet Protocol headers of at least some packets passing through the client side gateway;
    receiving at the client side gateway from the wide area network an inbound client side multicast data transfer packet;
    supplying to the client side local area network from the client side gateway an inbound client side unicast data transfer packet obtained by rewriting a first header of the inbound client side multicast data transfer packet;
    receiving at the client side gateway from the local area network an outbound client side unicast data transfer packet;
    supplying to the wide area network from the client side gateway an outbound client side multicast data transfer packet obtained by rewriting a second header of the outbound client side unicast data transfer packet;
    generating an identifier corresponding to the reception request;
    storing in a client side management table, the identifier in association with the Internet Protocol address of the outbound multicast data transfer packet;
    distributing from a server side gateway multicast data transfer packets;
    rewriting destination and origination Internet Protocol addresses contained in the Internet Protocol headers of at least some packets passing through the server side gateway;
    receiving at the server side gateway an inbound server side multicast data transfer packet;
    supplying to the server side local area network from the server side gateway an inbound server side unicast data transfer packet obtained by rewriting a third header of the inbound server side multicast data transfer packet;
    receiving at the server side gateway from the server side local area network an outbound server side unicast data transfer packet;
    supplying to the wide area network from the server side gateway an outbound server side multicast data transfer packet obtained by rewriting a fourth header of the outbound server side unicast data transfer packet,
    storing in a server side management table, the identifier in association with the Internet Protocol address of the outbound multicast data transfer packet;
    accepting the reception request from the at least one client;
    exchanging with the client side gateway data required for retrieving from at least one server a multicast data transfer packet specified by the reception request; and
    starting data transmission upon completing information exchange with the client side gateway.

5. At least one computer-readable storage medium storing instructions to control at least one processor to perform a method for connecting a wide area network to local area networks, comprising:
    receiving at a client side gateway a reception request from at least one client to receive multicast data transfer packets;
    rewriting destination and origination Internet Protocol addresses contained in Internet Protocol headers of at least some packets passing through the client side gateway;
    receiving at the client side gateway from the wide area network an inbound client side multicast data transfer packet;
    supplying to the client side local area network from the client side gateway an inbound client side unicast data transfer packet obtained by rewriting a first header of the inbound client side multicast data transfer packet;

receiving at the client side gateway from the local area network an outbound client side unicast data transfer packet;

supplying to the wide area network from the client side gateway an outbound client side multicast data transfer packet obtained by rewriting a second header of the outbound client side unicast data transfer packet;

generating an identifier corresponding to the reception request;

storing in a client side management table, the identifier in association with the Internet Protocol address of the outbound multicast data transfer packet;

distributing from a server side gateway multicast data transfer packets;

rewriting destination and origination Internet Protocol addresses contained in the Internet Protocol headers of at least some packets passing through the server side gateway;

receiving at the server side gateway an inbound server side multicast data transfer packet;

supplying to the server side local area network from the server side gateway an inbound server side unicast data transfer packet obtained by rewriting a third header of the inbound server side multicast data transfer packet;

receiving at the server side gateway from the server side local area network an outbound server side unicast data transfer packet;

supplying to the wide area network from the server side gateway an outbound server side multicast data transfer packet obtained by rewriting a fourth header of the outbound server side unicast data transfer packet, storing in a server side management table, the identifier in association with the Internet Protocol address of the outbound multicast data transfer packet;

accepting the reception request from the at least one client;

exchanging with the client side gateway data required for retrieving from at least one server a multicast data transfer packet specified by the reception request; and starting data transmission upon completing information exchange with the client side gateway.

\* \* \* \* \*